United States Patent
Zhang

(10) Patent No.: US 10,820,166 B1
(45) Date of Patent: Oct. 27, 2020

(54) SYSTEMS AND METHODS FOR OBTAINING LOCATION INTELLIGENCE

(71) Applicant: Toyota Connected North America, Inc., Plano, TX (US)

(72) Inventor: Dingchao Zhang, Plano, TX (US)

(73) Assignee: Toyota Connected North America, Inc., Plano, TX (US)

( * ) Notice: Subject to any disclaimer, the term of this patent is extended or adjusted under 35 U.S.C. 154(b) by 0 days.

(21) Appl. No.: 16/703,158

(22) Filed: Dec. 4, 2019

(51) Int. Cl.
| | |
|---|---|
| *H04W 4/021* | (2018.01) |
| *H04W 4/18* | (2009.01) |
| *H04W 4/40* | (2018.01) |
| *G06N 3/04* | (2006.01) |
| *G07C 5/08* | (2006.01) |
| *G07C 5/00* | (2006.01) |
| *G06N 3/08* | (2006.01) |
| *G06F 16/29* | (2019.01) |

(52) U.S. Cl.
CPC ............ *H04W 4/185* (2013.01); *G06F 16/29* (2019.01); *G06N 3/0454* (2013.01); *G06N 3/08* (2013.01); *G07C 5/008* (2013.01); *G07C 5/0841* (2013.01); *H04W 4/021* (2013.01); *H04W 4/40* (2018.02)

(58) Field of Classification Search
CPC .................................................... H04W 4/185
USPC ...................................................... 455/456.3
See application file for complete search history.

(56) References Cited

U.S. PATENT DOCUMENTS

| | | | | |
|---|---|---|---|---|
| 5,161,311 | A | * | 11/1992 | Esmer .................... B60K 35/00 324/245 |
| 6,728,631 | B1 | | 4/2004 | Hessing |
| 8,478,686 | B1 | * | 7/2013 | Giles ...................... G06Q 40/02 705/38 |
| 9,726,509 | B1 | * | 8/2017 | Thai .................... G01C 21/3461 |
| 9,900,747 | B1 | | 2/2018 | Park |
| 2016/0342865 | A1 | | 11/2016 | Tang et al. |
| 2017/0236411 | A1 | | 8/2017 | Sumers |
| 2018/0053108 | A1 | | 2/2018 | Olabiyi et al. |
| 2018/0365533 | A1 | | 12/2018 | Sathyanarayana et al. |
| 2019/0014445 | A1 | | 1/2019 | Cirit |
| 2020/0017117 | A1 | * | 1/2020 | Milton .................. B60W 50/02 |

OTHER PUBLICATIONS

Unknown, "Word2vec," https://en.wikipedia.org/wiki/Word2vec (Last accessed Dec. 4, 2019, 6 pages).

* cited by examiner

*Primary Examiner* — Joel Ajayi
(74) *Attorney, Agent, or Firm* — Christopher G. Darrow; Darrow Mustafa PC

(57) ABSTRACT

System, methods, and other embodiments described herein relate to location intelligence. In one embodiment, a method of obtaining location intelligence includes receiving a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles, combining the plurality of datasets to form a location tensor associated with the geographical location, extracting, from the location tensor, an embedding that indicates information contained in the location tensor, and storing the embedding in a database in association with the geographical location.

17 Claims, 5 Drawing Sheets

US 10,820,166 B1

SYSTEMS AND METHODS FOR OBTAINING LOCATION INTELLIGENCE

TECHNICAL FIELD

The subject matter described herein relates to systems and methods for obtaining location intelligence, and, more particularly, to determining types of vehicles and driver actions at one or more locations and detecting trends and patterns therein.

BACKGROUND

Location intelligence refers to analysis of geography or location that includes generating data points representing information applicable to general or specific geographic locations. Obtaining and utilizing location intelligence allows organizations to gain new insight about their customers, operational venues and potential target venues.

Examples of location intelligence include geocoding, which refers to converting an address into a geographic coordinate (e.g., latitude and longitude) that can be used to place a datapoint on a map, and reverse geocoding, which refers to converting latitude and longitude into a mapped address. While various geocoding methods exist for different types of location intelligence applications, geocoding does not provide a way to determine specific characteristics of a location, for example, types of vehicles and the actions of drivers that frequent the location.

SUMMARY

In one embodiment, example systems and methods are disclosed for determining types of vehicles that frequent a given location and driver action trends at the given location.

Therefore, a location intelligence system is disclosed. In one approach, the disclosed system includes one or more processors, a memory communicably connected to the one or more processors and storing a data module including one or more instructions that, when executed by the one or more processors, cause the one or more processors to receive a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles, and further cause the one or more processors to combine the plurality of datasets to form a location tensor associated with the geographical location, and an encoding module including one or more instructions that, when executed by the one or more processors, cause the one or more processors to extract, from the location tensor, an embedding that indicates information contained in the location tensor and store the embedding in a database in association with the geographical location.

In one embodiment a method of determining location intelligence is disclosed. The method includes receiving a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles, combining the plurality of datasets to form a location tensor associated with the geographical location, extracting, from the location tensor, an embedding that indicates information contained in the location tensor, and storing the embedding in a database in association with the geographical location.

In one embodiment, a non-transitory computer-readable medium is disclosed. The computer-readable medium stores instructions that when executed by one or more processors cause the one or more processors to perform the disclosed functions. The instructions include instructions to receive a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles, combine the plurality of datasets to form a location tensor associated with the geographical location, extract, from the location tensor, an embedding that indicates information contained in the location tensor, and store the embedding in a database in association with the geographical location.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with determining types of vehicles (and other information regarding said vehicles) that frequent given locations and driver actions that occur at the given locations are disclosed. The disclosed systems can extract embeddings to generate a map interface that characterizes locations in a unique manner which is advantageous for informing decisions related to, for example, marketing, store placement, advertising, municipal planning, etc.

In one or more disclosed embodiments, a location intelligence system can encode vehicle telematic data to extract compressed embeddings. The telematic data can include vehicle descriptive data, such as make, model, year, etc., as well as vehicle sensor data. By encoding the data, the disclosed embodiments can determine which types of vehicles frequent one or more given locations and driver actions that occur in the one or more locations. For example, one or more embodiments can determine that a given area is frequented by drivers of expensive vehicles who often exhibit risky driving actions (e.g., take turns at high speed or travel above a speed limit).

Figure 1:
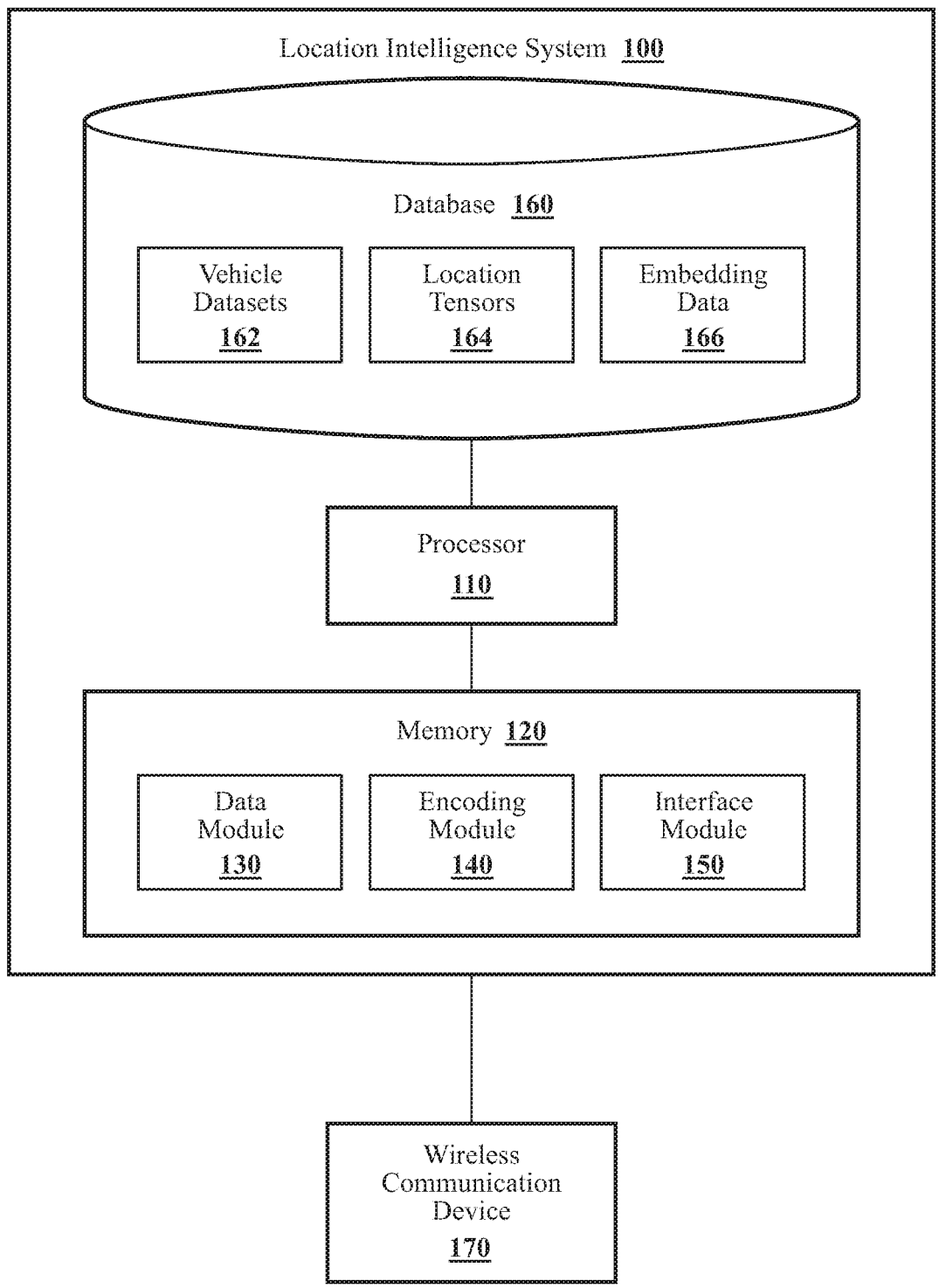
FIG. 1 illustrates an embodiment of a location intelligence system according to the disclosed subject matter.

Referring to FIG. 1, one embodiment of a location intelligence system 100 is illustrated. While arrangements will be described herein with respect to the location intelligence system 100, it should be understood that the disclosed embodiments are not limited to a unitary system as illustrated. In some implementations, the location intelligence system 100 may be embodied as a cloud-computing system, a cluster-computing system, a distributed computing system (e.g., across multiple facilities), a software-as-a-service (SaaS) system, and so on. Accordingly, the location intelligence system 100 is illustrated and discussed as a single computing system which may be disposed in a central server for purposes of discussion, but should not be interpreted to limit the overall possible configurations in which the disclosed components may be configured. For example, the separate modules, memories, databases, and so on may be distributed among various computing systems in varying combinations.

The location intelligence system 100 also includes various elements. It should be understood that in various embodiments and configurations, depending on the actual layout and implementation, it may not be necessary for the location intelligence system 100 to include all of the elements shown in FIG. 1. The location intelligence system 100 can have any combination of the various elements shown in FIG. 1. Further, the location intelligence system 100 can have additional elements to those shown in FIG. 1. In some arrangements, the location intelligence system 100 may be implemented without one or more of the elements shown in FIG. 1. Further, while the various elements are shown as being located within the location intelligence system 100 in FIG. 1, it will be understood that one or more of these elements can be located external to the location intelligence system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The location intelligence system 100 can be associated with one or more vehicles and implemented to perform methods and other functions as disclosed herein relating to, for example, obtaining telematic data, encoding the data, determining location information and creating a location information interface. The noted functions and methods will become more apparent with a further discussion of the figures.

The location intelligence system 100 is shown as including a processor 110. In various implementations the processor 110 may be a part of the location intelligence system 100, the location intelligence system 100 may access the processor 110 through a data bus or another communication pathway, the processor 110 may be a remote computing resource accessible by the location intelligence system 100, and so on. In any case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the location intelligence system 100 includes a memory 120 that stores a data module 130, an encoding module 140 and an interface module 150. The memory 120 is a random-access memory (RAM), read-only memory (ROM), a hard-disk drive, a flash memory, or other suitable memory for storing the modules 130, 140 and 150. The modules 130, 140 and 150 are, for example, computer-readable instructions that when executed by the processor 110 cause the processor 110 to perform the various functions disclosed herein, as will be described further below. In various embodiments, the modules 130, 140 and 150 can be implemented in different forms that can include but are not limited to hardware logic, an ASIC, components of the processor 110, instructions embedded within an electronic memory, and so on.

With continued reference to the location intelligence system 100, in one embodiment, the system 100 includes a data store 160, which may be implemented as a database 160. The database 160 is, in one embodiment, an electronic data structure that may be stored in the memory 120 or elsewhere, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140 and 150 in executing various determinations. In one embodiment, the database 160 stores data including vehicle datasets 162, location tensors 164 and embedding data 166.

The location intelligence system 100 can also include or be operably connected to a wireless communication device 170 that allows the data module 130 to communicate with, for example, vehicle systems, external computing devices, communication networks, and other systems. The communication device 170 can be configured to communicate, for example, over a local area network, a wide area network (e.g., the Internet), directly with a target system via an established protocol such as Bluetooth™, Wifi, infrared (IR), vehicle-to-everything (V2X), cellular networks, or through other communications methods.

Referring back to the modules 130, 140 and 150, the data module 130 can be constructed including instructions that function to control the processor 110 to receive a dataset from a vehicle, the dataset being associated with a geographical location. The dataset can include vehicle description information (e.g., make, model, year, etc.) and feature data that indicates a status of a feature of the vehicle, such as telematic data obtained from one or more sensors installed on the vehicle as the vehicle travelled through the geographic location. In one or more embodiments, the feature data can include a minimum and maximum sensor value, per sensor of one or more sensors, over a predetermined time window (e.g., one second, ten seconds, one minutes, ten minutes, etc.).

The data module 130 can store the dataset in the database 160 in association with the geographic location. The data module 130 can similarly receive additional datasets from other vehicles, each dataset including respective vehicle description information and telematic data and each dataset being associated with respective geographic locations. The data module 130 can therefore collectively store a plurality of datasets 162 in the data store 160, each in association with respective geographic locations. The data module 130 can further include instructions that function to control the processor 110 to combine a plurality of datasets 162 to create a location tensor 164.

The encoding module 140 can be constructed including instructions that function to extract, from a location tensor 164, an embedding 166 that represents the location tensor 164. For example, in one or more embodiments the encoding can reduce a dimensionality of a location tensor 164 to create the embedding 166. The encoding module 140 can store the embedding 166 in the database 160. Furthermore, the encoding module 140 can extract and store a plurality of embeddings 166 from a plurality of location tensors 164 associated with various locations.

The interface module 150 can be constructed including instructions that function to control the processor 110 to analyze the plurality of embeddings 166 and generate an analysis interface to display results based on the analysis. In one or more embodiments the analysis can include a specific query response or a clustering analysis. In one or more embodiments the interface module 150 can generate the interface as a map interface, for example, to highlight regions that are responsive to a query or to facilitate identifying patterns and trends in collective embedding data 166 of a geographic region.

Figure 2:
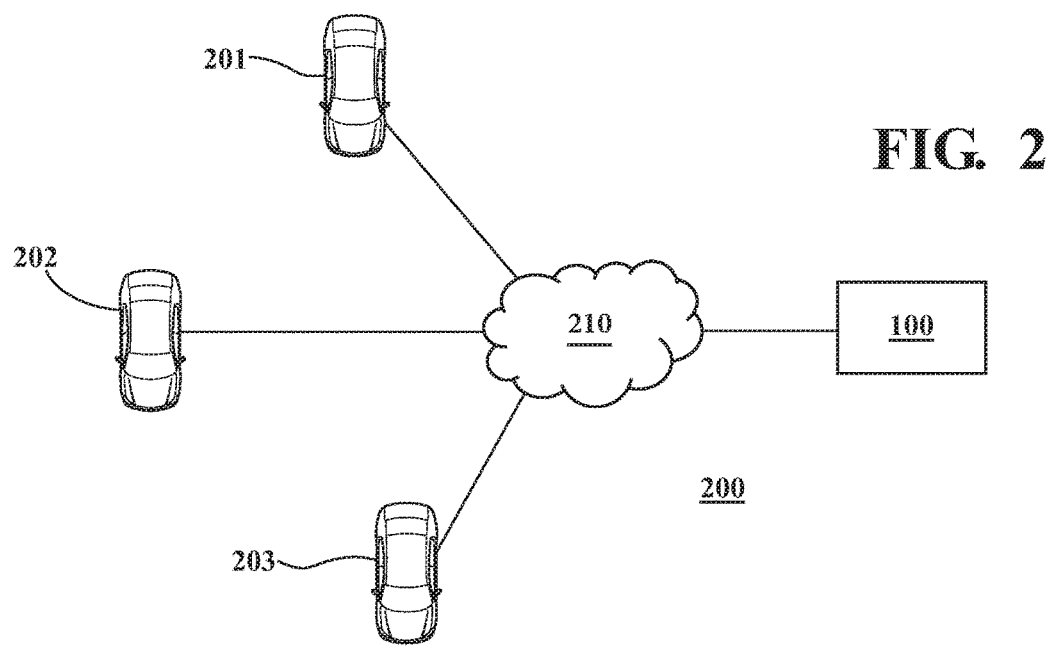
FIG. 2 illustrates an example setting that can implement a location intelligence system according to the disclosed subject matter.

FIG. 2 illustrates an environment 200 that can implement the disclosed location intelligence system 100. In one or more embodiments the location intelligence system 100 is implemented within a computing device (e.g., a server) having access to a network 210 (e.g., a wide-area network (WAN), the Internet, etc.). A plurality of vehicles 201, 202, 203 likewise have access to the network 210 and can transmit datasets 162 to the location intelligence system 100 via the network 210.

Figure 3:
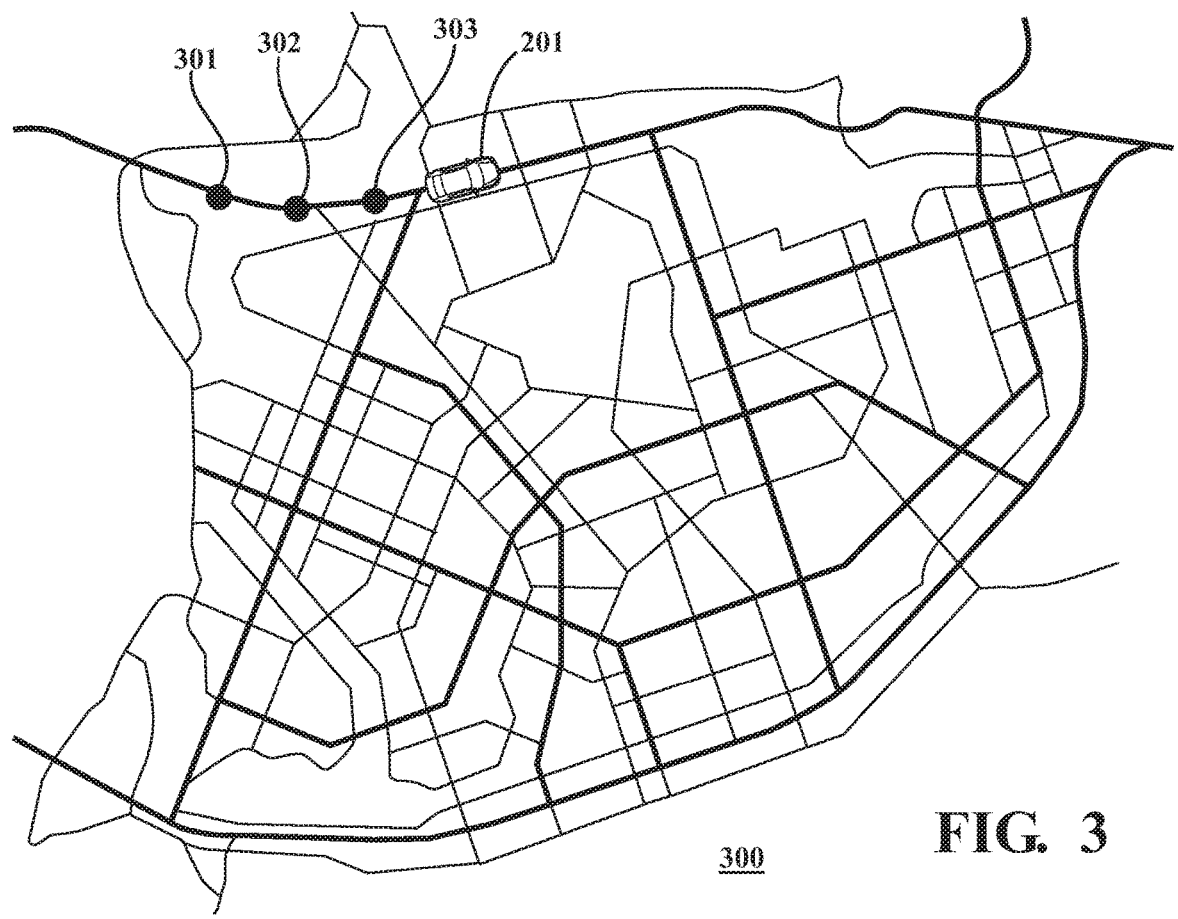
FIG. 3 illustrates an example scenario of a vehicle traveling through a geographic region according to the disclosed subject matter.

FIG. 3 illustrates a vehicle 201 traveling through a mapped area 300. In one or more embodiments the vehicle 201 periodically transmits datasets to the location intelligence system 100. For example, the vehicle can transmit datasets on a time cycle (e.g., every ten seconds) or a distance cycle (e.g., every 100 meters). The transmitted datasets can be associated with the location from which they are transmitted. For example, datasets transmitted from locations 301, 302, 303 can include longitude and latitude coordinates corresponding to the respective transmission locations.

Similarly, multiple vehicles (not shown) may traverse the mapped area 300 while periodically transmitting datasets to the location intelligence system 100. Multiple vehicles can transmit datasets from the same or substantially the same locations. In this manner the location intelligence system 100 can obtain a plurality of datasets associated with a given location. For example, a first plurality of datasets can be associated with location 301, a second plurality of datasets can be associated with location 302, and so on. In one or more embodiments, the data module 130 can normalize the location coordinates. For example, the data module 130 can group together all datasets associated with location coordinates within a radius of 100 meters as all being associated with one and the same location.

A dataset can include vehicle descriptive information, such as the make and model of the vehicle, the year it was manufactured, mileage, etc. A dataset can also include feature values that are obtained from the vehicle. The feature values can indicate a status of one or more features of the vehicle and can include, for example, one or more of engine speed (e.g., in RPM), individual wheel speeds, fuel consumption rate, lane detection information (e.g., white line crossing), steering angle, steering angle speed, acceleration, driving mode (e.g., sport mode, snow mode, eco mode, etc.), percent value of gas pedal depression, percent value of brake pedal depression, gear setting, window status (e.g., raised or lowered), and other features. The exact composition of the dataset can depend on a desired implementation of the location intelligence system 100, e.g., tailored to obtain select intelligence, as well as available features per vehicle. For example, in one implementation the dataset can include features limited to one or more of vehicle descriptive information, vehicle speed, vehicle acceleration, steering angle, and steering angle speed. In another implementation the dataset can include features limited to one or more of vehicle descriptive information, driving mode, and brake pedal depression, and so on.

In one or more embodiments, the data module 130 can process a received dataset to include additional data based on the information included in the dataset. For example, the data module 130 can analyze the vehicle description information (make, model, year, mileage) to determine an original cost value for the vehicle, an age, and a present estimated value. As another example the data module 130 can analyze one or more feature values to determine a rating value or a label. The data module 130 can store these determinations as metadata associated with the dataset or can include the determinations as part of the dataset.

The data module 130 can combine multiple datasets 162 to create location tensors 164 and store the tensors 164 in the database 160. The data module 130 can create the location tensors 164 as multi-dimensional data structures than include multiple datasets associated with a given location over a predetermined amount of time, e.g., one hour, one week, one month, etc. The dimensions of the location tensor 164 can be determined, for example, based on a number of samples, number of time steps, and/or number of features.

For example, at one location, for one hour, 1,000 datasets may be obtained. Each dataset can include ten different features. The tensor can be formed having dimensions of 1,000 (datasets)×60 (per minute)×10 (features). The tensor can be assigned a single timestamp (e.g., 1:00 PM) and associated with the location.

The data module 130 may create location tensors 164 that are large, high dimension data structures, which can result in high computational costs, for example, when attempting complex analysis across large numbers of tensors. The encoding module 140 can encode location tensors 164 to extract dense embedding data 166 that represent the location tensors 164 and that have lower computation processing costs. In one or more embodiments, the encoding module 140 can use an autoencoder neural network to extract the embedding data 166 such that the embedding data 166 indicates information that is contained in the location tensor 164.

Figure 4:
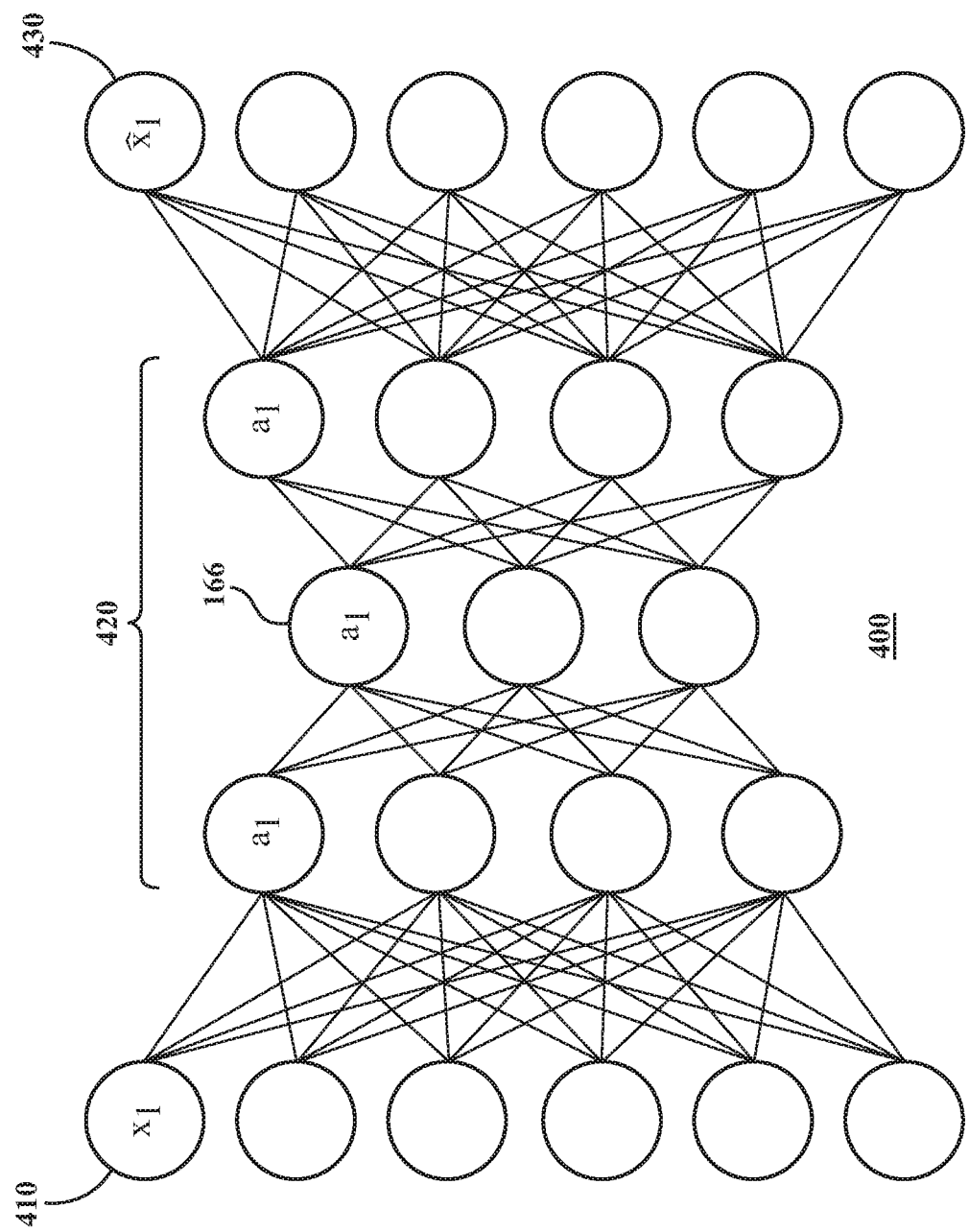
FIG. 4 illustrates an example autoencoder network architecture according to the disclosed subject matter.

FIG. 4 illustrates an example architecture of an autoencoder neural network 400 that the encoding module 140 can use to extract an embedding 166 from a location tensor 164. The network 400 includes an input layer 410, one or more hidden layers 420 and an output layer 430. The network 400 is shown having three hidden layers 420, however, in implementation a greater number of hidden layers may exist. The network 400 can receive an input x having multiple dimensions (1, 2 . . . ) and reduce the dimensionality by compressing the data as it passes through the network 400.

After the input data has been compressed, the network 400 attempts to reconstruct the original input x from the compressed data a. To improve accuracy of representation of the compressed data a, the network 400 can be trained to reduce a loss function between the output 2 and the input x.

The network 400 therefore can learn an improved model that better captures relationships in the data. By training the network 400 to reduce the loss function, the compressed data can achieve a dense representative data structure that is more accurate than less precise techniques to reduce large datasets and obtain representative values, such as determining mean or median values.

In one or more embodiments, the encoder module 140 extracts the embedding data 166 from a layer in the hidden layers 420 at which the input data dimensionality has been reduced to the greatest extent within the network 400. The embedding data 166 indicates the information about the associated location in a condensed form that is more suitable for processing, for example, to identify patterns or trends that may exist in a given area, for comparing one area to another or other types of analysis.

The interface module 150 can analyze the embedding data 166 and present results in a display, e.g., in a map interface. For example, a user may input a query requesting information regarding regional trends in a particular combination of attributes, e.g., areas that are frequented by vehicles with an original cost greater than $80,000, that are more than four years old, and that are driven at least 10 mph above the local speed limit. The interface module 150 can analyze the embedding data 166 to determine locations that meet the requested data.

Figure 5:
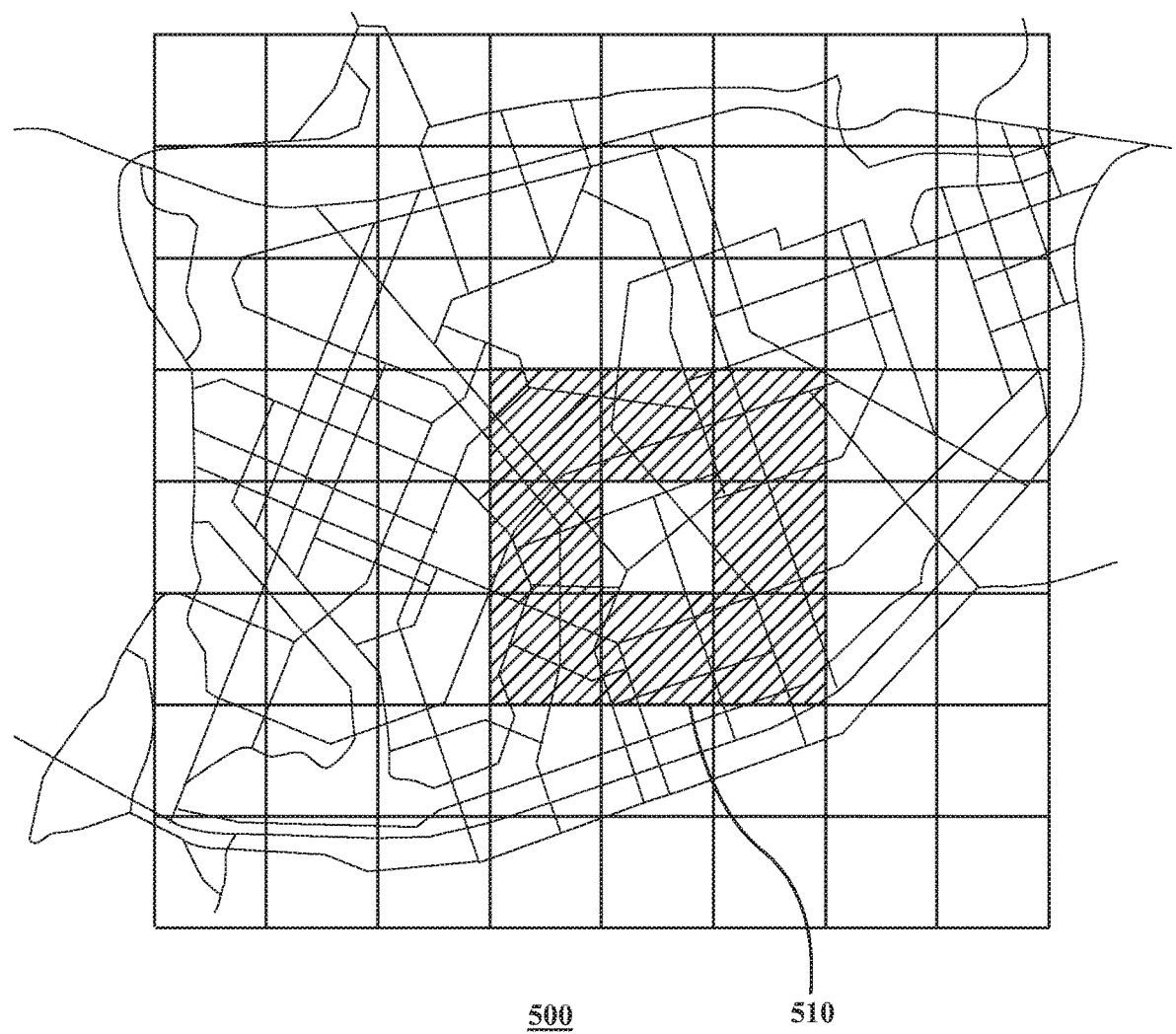
FIG. 5 illustrates an example interface generated according to the disclosed subject matter.

FIG. 5 shows an example map interface 500 that the interface module 150 can generate in response to the query. The interface module 150 can analyze the embedding data 166 to determine a set of location coordinates 510 that have the attributes requested in the query, according to the embedding data 166.

In one or more embodiments the interface module 150 can process the embedding data 166 using a cluster analysis to identify one or more trends or patterns in the embedding data 166. For example, the interface module 150 can group classify embeddings into one or more groups of embeddings that have similar properties or characteristics and display the groupings on an interface. In this manner previously unknown patterns may emerge that provide insight on particular locations.

For example, in one implementation the interface module 150 may identify areas along a straight road exhibiting a pattern of vehicles turning sharply, as indicated by steering angle features in the embedding data 166. Such an identification may prompt further investigation to determine whether potholes are present. In another example, the interface module 150 may identify an area frequented by low cost vehicles that tend to drive below the speed limit, which may be useful for advertising purposes or potential dealership placement decisions.

Figure 6:
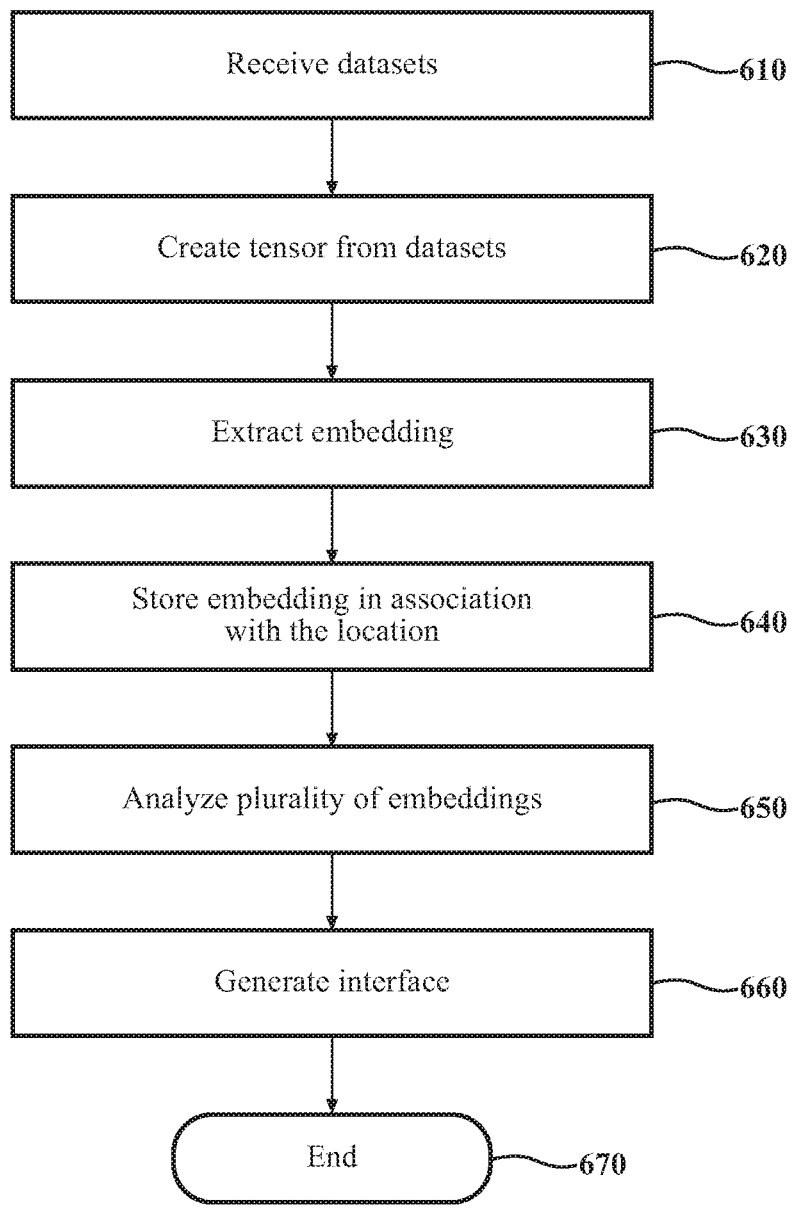
FIG. 6 illustrates a flow chart of a method of controlling a location intelligence system according to the disclosed subject matter.

FIG. 6 illustrates a flowchart of an example method 600 that is associated with operations of the disclosed location intelligence system 100. The method 600 will be discussed from the perspective of the disclosed location intelligence system 100 of FIGS. 1-5. While the method 600 is discussed in combination with the system 100, it should be appreciated that the method 600 is not limited to being implemented within system 100, which is merely one example of a system that may implement the method 600. Furthermore, one of ordinary skill in the art will recognize that the method 600 is merely one example method of implementing the disclosed embodiments. Different variations may be constructed according to implementation in a given setting or situation.

At operation 610 the location intelligence system 100 (e.g., data module 130) receives datasets from vehicles. For example, vehicles traveling within a given region (e.g., a neighborhood, a town, a city, a county, within a predetermined geographical boundary, etc.) can transmit datasets to the location intelligence system 100 over a period of time. Each dataset can have an associated geographic coordinate. The data module 130 can normalize the coordinates or group local coordinates together under one location, for example, within a 100-meter radius. Among the datasets, multiple datasets can be associated with the same geographic coordinates and/or a same geographic location.

Each dataset includes at least vehicle descriptive information that describes one or more aspects of the transmitting vehicle (e.g., make, model, manufacturing year, mileage, etc.) and feature data that indicates a status of at least one feature of the transmitting vehicle. The exact contents of a dataset can depend upon implementation of the location intelligence system 100 (e.g., according to preselected features to be included in the datasets) or capability of the vehicle (e.g., according to which features the vehicle is capable of detecting and transmitting and status value for). In one or more embodiments, the feature data can include at least a minimum and maximum sensor value, per sensor of one or more sensors installed in the respective vehicle, over a predetermined time window.

At operation 620 the data module 130 creates a multidimensional location tensor that combines information from multiple datasets associated with a particular location. For example, the data module 130 can create the location tensor to include all datasets at a selected location that span a selected time period, e.g., one hour, one day, one week, etc. The data module 130 can create multiple location tensors, for example, to cover a selected geographic region, such as a neighborhood, a city, etc.

At operation 630 the location intelligence system 100 (e.g., the encoding module 140) extracts, from a location tensor, an embedding that indicates information contained in the location tensor. In one or more embodiments, the encoding module 140 inputs the location tensor into an autoencoder neural network that compresses the tensor in one or more hidden layers and extracts the embedding from one of the one or more hidden layers at which a greatest reduction occurs.

At operation 640 the encoding module 140 stores the embedding 166 in the database 160 in association with the location of the location tensor.

At operation 650 the location intelligence system 100 (e.g., the interface module 150) analyzes a plurality of embeddings generated by the encoding module 140. The plurality of embeddings can be associated with locations in a selected geographic region. In one or more embodiments the analysis can include executing a clustering algorithm to classify the plurality of embeddings into one or more groups of embeddings that have one or more similar characteristics. For example, the clustering algorithm can identify trends or patterns in embeddings across the selected region.

In one or more embodiments the location intelligence system 100 can receive an input query and the analysis can include determining a set of location coordinates that, according to the embedding data, have attributes identified in the query. For example, a user can input a query seeking locations that meet certain criteria, such as frequented by older model vehicles that drive below the speed limit.

In any case, at operation 660 the interface module 150 can provide the results of the analysis on a map interface that shows responsive geographic locations. The process ends at 670.

Accordingly, the disclosed location intelligence system 100 can advantageously generate dense embeddings that represent characteristics of vehicles and driver actions associated with geographic locations. The disclosed embodiments provide ways to detect trends in location intelligence and to identify specific patterns of vehicles or driver actions per location. Thus, the disclosed embodiments significantly improve the strategic decision-making capability of municipal planners, store planners, advertisers, etc.

In addition to the above described configurations, it should be appreciated that the location intelligence system 100 from FIG. 1 can be configured in various arrangements with separate integrated circuits and/or chips. In such embodiments, the data module 130, encoding module 140 and interface module 150 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140 and 150 may be combined into a separate application-specific integrated circuit. In further embodiments, portions of the functionality associated with the modules 130, 140 and 150 may be embodied as firmware executable by a processor and stored in a non-transitory memory. In still further embodiments, the modules 130, 140 and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 600 of FIG. 6) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

As previously described, the location intelligence system 100 can include one or more processors 110. In one or more arrangements, the processor(s) 110 can be a main processor of the location intelligence system 100. For instance, the processor(s) 110 can be an electronic control unit (ECU). The location intelligence system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A location intelligence system that can identify geographic areas for advertising placement, store placement and/or municipal planning, comprising:
one or more processors; and
a memory communicably connected to the one or more processors and storing:
a data module including one or more instructions that, when executed by the one or more processors, cause the one or more processors to receive a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles, process at least one dataset from the plurality of datasets to obtain, from a database or external system, additional information that was not included in the at least one dataset based at least in part on information included in the at least one dataset, the additional information including at least an original cost value and an estimated present value for a vehicle associated with the at least one dataset, include the additional information in the at least one dataset, and further cause the one or more processors to combine the plurality of datasets to form a location tensor associated with the geographical location;
an encoding module including one or more instructions that, when executed by the one or more processors, cause the one or more processors to extract, from the location tensor, an embedding that indicates information contained in the location tensor and store the embedding in a database in association with the geographical location; and an interface module including one or more instructions that, when executed by the one or more processors, cause the one or more processors to identify a geographic area frequented by vehicles having a present value or original cost exceeding a threshold amount.

2. The location intelligence system of claim 1, wherein the interface module further includes instructions that, when executed by the one or more processors, cause the one or more processors to:

analyze a plurality of embeddings extracted by the encoding module, the plurality of embeddings being associated with locations in a geographic region; and generate a map interface to display a result of the analysis.

3. The location intelligence system of claim 2, wherein analyzing the plurality of embeddings comprises executing a clustering algorithm to classify the plurality of embeddings into one or more groups of embeddings that have one or more similar characteristics.

4. The location intelligence system of claim 2, wherein analyzing a plurality of embeddings comprises determining a set of location coordinates that, according to the plurality of embeddings, have attributes identified in a query inputted to the location intelligence system.

5. The location intelligence system of claim 1, wherein the encoding module further includes instructions to extract the embedding by:

inputting the location tensor into an autoencoder neural network that compresses the location tensor in one or more hidden layers; and extracting the embedding from one of the one or more hidden layers at which a greatest reduction occurs.

6. The location intelligence system of claim 1, wherein the vehicle descriptive information includes at least information indicating a make, model and manufacturing year of the respective vehicle.

7. A method of obtaining location intelligence that can identify geographic areas for advertising placement, store placement and/or municipal planning, comprising:

receiving a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles;

processing at least one dataset from the plurality of datasets to obtain, from a database or external system, additional information that was not included in the at least one dataset based at least in part on information included in the at least one dataset, the additional information including at least an original cost value and an estimated present value for a vehicle associated with the at least one dataset;

including the additional information in the at least one dataset;

combining the plurality of datasets to form a location tensor associated with the geographical location;

extracting, from the location tensor, an embedding that indicates information contained in the location tensor;

storing the embedding in a database in association with the geographical location; and identifying a geographic area frequented by vehicles having a present value or original cost exceeding a threshold amount.

8. The method of claim 7, further comprising:

analyzing a plurality of extracted embeddings, the plurality of extracted embeddings being associated with locations in a geographic region; and generating a map interface to display a result of the analysis.

9. The method of claim 8, wherein analyzing the plurality of extracted embeddings comprises executing a clustering algorithm to classify the plurality of extracted embeddings into one or more groups of embeddings that have one or more similar characteristics.

10. The method of claim 8, wherein analyzing the plurality of extracted embeddings comprises determining a set of location coordinates that, according to the plurality of extracted embeddings, have attributes identified in an input query.

11. The method of claim 7, further comprising:

inputting the location tensor into an autoencoder neural network that compresses the location tensor in one or more hidden layers; and extracting the embedding from one of the one or more hidden layers at which a greatest reduction occurs.

12. The method of claim 7, wherein the vehicle descriptive information includes at least information indicating a make, model and manufacturing year of the respective vehicle.

13. A non-transitory computer-readable medium storing instructions for obtaining location intelligence that can identify geographic areas for advertising placement, placement and/or municipal planning and that when executed by one or more processors cause the one or more processors to:

receive a plurality of datasets from a plurality of vehicles, the datasets being associated with a same geographical location and respectively including at least vehicle descriptive information that describes one or more aspects of the respective vehicles and feature data that indicates a status of at least one respective feature of the respective vehicles;

process at least one dataset from the plurality of datasets to obtain, from a database or external system, additional information that was not included in the at least one dataset based at least in part on information included in the at least one dataset, the additional information including at least an original cost value and an estimated present value for a vehicle associated with the at least one dataset;

include the additional information in the at least one dataset;

combine the plurality of datasets to form a location tensor associated with the geographical location;

extract, from the location tensor, an embedding that indicates information contained in the location tensor;

store the embedding in a database in association with the geographical location; and identify a geographic area frequented by vehicles having a present value or original cost exceeding a threshold amount.

14. The non-transitory computer-readable medium of claim 13, further comprising:

analyze a plurality of extracted embeddings, the plurality of extracted embeddings being associated with locations in a geographic region; and generate a map interface to display a result of the analysis.

15. The non-transitory computer-readable medium of claim 14, wherein analyzing the plurality of extracted embeddings comprises executing a clustering algorithm to classify the plurality of extracted embeddings into one or more groups of embeddings that have one or more similar characteristics.

16. The non-transitory computer-readable medium of claim 14, wherein analyzing the plurality of extracted embeddings comprises determining a set of location coordinates that, according to the plurality of extracted embeddings, have attributes identified in a query inputted to the location intelligence system.

17. The non-transitory computer-readable medium of claim 13, further comprising:
- inputting the location tensor into an autoencoder neural network that compresses the location tensor in one or more hidden layers; and
- extracting the embedding from one of the one or more hidden layers at which a greatest reduction occurs.

* * * * *